United States Patent
Cakmakci et al.

(10) Patent No.: US 9,671,614 B2
(45) Date of Patent: Jun. 6, 2017

(54) SEE-THROUGH EYEPIECE FOR HEAD WEARABLE DISPLAY

(71) Applicant: Google Inc., Mountain View, CA (US)

(72) Inventors: Ozan Cakmakci, Sunnyvale, CA (US); Anurag Gupta, San Jose, CA (US); Oscar A. Martinez, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/239,617

(22) Filed: Aug. 17, 2016

(65) Prior Publication Data

US 2016/0357018 A1 Dec. 8, 2016

Related U.S. Application Data

(63) Continuation of application No. 14/135,284, filed on Dec. 19, 2013, now Pat. No. 9,459,455.

(51) Int. Cl.
| | |
|---|---|
| G02B 27/14 | (2006.01) |
| G02B 27/01 | (2006.01) |
| G02B 5/30 | (2006.01) |
| G02B 1/18 | (2015.01) |
| G02B 27/28 | (2006.01) |

(52) U.S. Cl.
CPC .......... *G02B 27/0172* (2013.01); *G02B 1/18* (2015.01); *G02B 5/30* (2013.01); *G02B 27/144* (2013.01); *G02B 27/283* (2013.01); *G02B 2027/0118* (2013.01); *G02B 2027/0123* (2013.01)

(58) Field of Classification Search
USPC ........................................ 359/630, 631, 633
See application file for complete search history.

(56) References Cited

U.S. PATENT DOCUMENTS

| | | |
|---|---|---|
| 4,218,111 A | 8/1980 | Withrington et al. |
| 4,220,400 A | 9/1980 | Vizenor |
| | (Continued) | |

FOREIGN PATENT DOCUMENTS

| | | |
|---|---|---|
| EP | 0 898 726 B1 | 3/1999 |
| EP | 0 995 145 B1 | 4/2000 |
| | (Continued) | |

OTHER PUBLICATIONS

Cakmakci, O. et al., "Head-Worn Displays: A Review", IEEE, Journal of Display Technology, vol. 2, No. 3, Sep. 2006, pp. 199-216.

(Continued)

*Primary Examiner* — Jack Dinh
(74) *Attorney, Agent, or Firm* — Blakely Sokoloff Taylor & Zafman LLP

(57) ABSTRACT

An eyepiece for a head wearable display includes a light guide component for guiding display light received at a peripheral location and emitting the display light at a viewing region. The light guide component includes an eye-ward facing surface having a reflection portion and a viewing portion, a folding surface oriented to reflect the display light received into the light guide component to the reflection portion of the eye-ward facing surface, and a first interface surface oriented to receive the display light reflected from the reflection portion of the eye-ward facing surface. A partially reflective layer is disposed on the first interface surface in the viewing region to reflect the display light through viewing portion of the eye-ward facing surface.

20 Claims, 7 Drawing Sheets

(56) References Cited

U.S. PATENT DOCUMENTS

| | | |
|---|---|---|
| 4,560,233 A | 12/1985 | Banbury |
| 4,711,512 A | 12/1987 | Upatnieks |
| 4,799,765 A | 1/1989 | Ferrer |
| 4,968,117 A | 11/1990 | Chern et al. |
| 5,050,966 A | 9/1991 | Berman |
| 5,076,664 A | 12/1991 | Migozzi |
| 5,093,567 A | 3/1992 | Staveley |
| 5,237,455 A | 8/1993 | Bordo et al. |
| 5,257,133 A | 10/1993 | Chen |
| 5,537,253 A | 7/1996 | Cox et al. |
| 5,539,422 A | 7/1996 | Heacock et al. |
| 5,654,827 A | 8/1997 | Reichert |
| 5,694,230 A | 12/1997 | Welch |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,821,911 A | 10/1998 | Jachimowicz |
| 5,844,530 A | 12/1998 | Tosaki |
| 5,880,888 A | 3/1999 | Schoenmakers et al. |
| 5,886,822 A | 3/1999 | Spitzer |
| 5,896,232 A | 4/1999 | Budd et al. |
| 5,923,476 A | 7/1999 | Heffner |
| 5,943,171 A | 8/1999 | Budd et al. |
| 5,949,583 A | 9/1999 | Rallison et al. |
| 5,995,071 A | 11/1999 | Mertz |
| 6,005,714 A | 12/1999 | Welch |
| 6,023,372 A | 2/2000 | Spitzer et al. |
| 6,057,966 A | 5/2000 | Carroll et al. |
| 6,091,546 A | 7/2000 | Spitzer |
| 6,094,241 A | 7/2000 | Yamazaki |
| 6,111,701 A | 8/2000 | Brown |
| 6,147,807 A | 11/2000 | Droessler et al. |
| 6,172,657 B1 | 1/2001 | Kamakura et al. |
| 6,201,629 B1 | 3/2001 | McClelland et al. |
| 6,204,974 B1 | 3/2001 | Spitzer |
| 6,204,975 B1 | 3/2001 | Watters et al. |
| 6,222,677 B1 | 4/2001 | Budd et al. |
| 6,236,509 B1 | 5/2001 | Grandjean et al. |
| 6,236,511 B1 | 5/2001 | Brown |
| 6,330,118 B1 | 12/2001 | Daschner et al. |
| 6,349,001 B1 | 2/2002 | Spitzer |
| 6,349,004 B1 | 2/2002 | Fischer et al. |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,396,639 B1 | 5/2002 | Togino et al. |
| 6,462,882 B2 | 10/2002 | Chen et al. |
| 6,466,471 B1 | 10/2002 | Bhattacharyya |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,760,169 B2 | 7/2004 | Takahashi et al. |
| 6,825,987 B2 | 11/2004 | Repetto et al. |
| 6,829,095 B2 | 12/2004 | Amitai |
| 6,847,488 B2 | 1/2005 | Travis |
| 6,879,443 B2 | 4/2005 | Spitzer et al. |
| 6,961,162 B2 | 11/2005 | Nakamura et al. |
| 7,057,814 B2 | 6/2006 | Boyd et al. |
| 7,095,562 B1 | 8/2006 | Peng et al. |
| 7,119,965 B1 | 10/2006 | Rolland et al. |
| 7,145,726 B2 | 12/2006 | Geist |
| 7,158,096 B1 | 1/2007 | Spitzer |
| 7,205,960 B2 | 4/2007 | David |
| 7,210,803 B2 | 5/2007 | Matsunaga et al. |
| 7,230,766 B2 | 6/2007 | Rogers |
| 7,242,527 B2 | 7/2007 | Spitzer et al. |
| 7,391,573 B2 | 6/2008 | Amitai |
| 7,411,637 B2 | 8/2008 | Weiss |
| 7,450,310 B2 | 11/2008 | McGuire |
| 7,457,040 B2 | 11/2008 | Amitai |
| 7,542,209 B2 | 6/2009 | McGuire, Jr. et al. |
| 7,566,863 B2 | 7/2009 | Chang et al. |
| 7,576,916 B2 | 8/2009 | Amitai |
| 7,577,326 B2 | 8/2009 | Amitai |
| 7,586,686 B1 | 9/2009 | Hall |
| 7,595,480 B2 | 9/2009 | Kress |
| 7,595,933 B2 | 9/2009 | Tang |
| 7,637,617 B2 | 12/2009 | Liu et al. |
| 7,643,214 B2 | 1/2010 | Amitai |
| 7,663,805 B2 | 2/2010 | Zaloum et al. |
| 7,672,055 B2 | 3/2010 | Amitai |
| 7,715,103 B2 | 5/2010 | Sprague et al. |
| 7,724,441 B2 | 5/2010 | Amitai |
| 7,724,442 B2 | 5/2010 | Amitai |
| 7,724,443 B2 | 5/2010 | Amitai |
| 7,821,715 B2 | 10/2010 | Suzuki et al. |
| 7,843,403 B2 | 11/2010 | Spitzer |
| 7,900,068 B2 | 3/2011 | Weststrate et al. |
| 8,004,765 B2 | 8/2011 | Amitai |
| 8,212,859 B2 | 7/2012 | Tang et al. |
| 8,294,994 B1 | 10/2012 | Kelly |
| 8,336,333 B2 | 12/2012 | Ushigome |
| 8,384,999 B1 | 2/2013 | Crosby et al. |
| 8,411,365 B2 | 4/2013 | Saito |
| 8,471,967 B2 | 6/2013 | Miao et al. |
| 8,488,246 B2 | 7/2013 | Border et al. |
| 8,665,178 B1 | 3/2014 | Wang |
| 2002/0015116 A1 | 2/2002 | Park |
| 2002/0167733 A1 | 11/2002 | Roest |
| 2002/0186179 A1 | 12/2002 | Knowles |
| 2003/0090439 A1 | 5/2003 | Spitzer et al. |
| 2003/0107816 A1 | 6/2003 | Takagi et al. |
| 2004/0190150 A1 | 9/2004 | Nagaoka |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2006/0215244 A1 | 9/2006 | Yosha et al. |
| 2007/0070859 A1 | 3/2007 | Hirayama |
| 2008/0219025 A1 | 9/2008 | Spitzer et al. |
| 2009/0067057 A1 | 3/2009 | Sprague et al. |
| 2009/0122414 A1 | 5/2009 | Amitai |
| 2010/0046070 A1 | 2/2010 | Mukawa |
| 2010/0046075 A1 | 2/2010 | Powell et al. |
| 2010/0079356 A1 | 4/2010 | Hoellwarth |
| 2010/0103078 A1 | 4/2010 | Mukawa et al. |
| 2010/0149073 A1 | 6/2010 | Chaum et al. |
| 2010/0278480 A1 | 11/2010 | Vasylyev et al. |
| 2011/0149201 A1 | 6/2011 | Powell et al. |
| 2011/0193814 A1 | 8/2011 | Gay et al. |
| 2011/0213664 A1 | 9/2011 | Osterhout et al. |
| 2011/0221656 A1 | 9/2011 | Haddick et al. |
| 2012/0162549 A1 | 6/2012 | Gao et al. |
| 2012/0212398 A1 | 8/2012 | Border et al. |
| 2012/0212399 A1 | 8/2012 | Border et al. |
| 2012/0249797 A1 | 10/2012 | Haddick et al. |
| 2012/0293548 A1 | 11/2012 | Perez et al. |
| 2013/0033756 A1 | 2/2013 | Spitzer et al. |
| 2013/0229712 A1 | 9/2013 | Kress |

FOREIGN PATENT DOCUMENTS

| | | |
|---|---|---|
| EP | 1 930 762 A1 | 6/2008 |
| EP | 1 465 003 B1 | 12/2008 |
| GB | 2 272 980 A | 6/1994 |
| JP | 2001-066543 A | 3/2001 |
| JP | 4550184 B2 | 9/2010 |
| WO | WO 96/05533 A1 | 2/1996 |
| WO | WO 2007/065995 A1 | 6/2007 |
| WO | WO 2009/153446 A2 | 12/2009 |
| WO | WO 2010/097439 A1 | 9/2010 |
| WO | WO 2013/112705 A1 | 8/2013 |
| WO | WO 2013/175465 A1 | 11/2013 |

OTHER PUBLICATIONS

Mukawa, H. et al., "8.4: *Distinguished Paper*: A Full Color Eyewear Display using Holographic Planar Waveguides", SID Symposium Digest of Technical Papers, May 2008, vol. 39, Issue 1, pp. 89-92.

(56) References Cited

OTHER PUBLICATIONS

Cakmakci, O. et al. "Design of a Freeform Single-Element Head-Worn Display", Proc. of SPIE vol. 7618, 761803, 2010, 6 pages.

Kress, B. et al., "Low Cost Replicable Plastic HUD combiner element", Photonics in the Transportation Industry: Auto to Aerospace II, Proc. SPIE vol. 7314, 73140I, Apr. 2009, 8 pages.

Kress, B. et al., "Digital combiner achieves low cost and high reliability for head-up display applications", SPIE Newsroom. DOI: 10.1117/2.1200904.1599, May 2009, 3 pages.

Kress, B. et al., "Applied Digital Optics: From Micro-optics to Nanophotonics, Chapter 5: Digital Diffractive Optics: Analytic Type", 40 pages, 2009, John Wiley & Sons, Ltd.

Kress, B. et al., "Applied Digital Optics: From Micro-optics to Nanophotonics, Chapter 12: Digital Optics Fabrication Techniques", 74 pages, 2009, John Wiley & Sons, Ltd.

Kress, B. et al., "Applied Digital Optics: From Micro-optics to Nanophotonics, Chapter 14: Replication Techniques for Digital Optics", 27 pages, 2009, John Wiley & Sons, Ltd.

Kress, B. et al., "Applied Digital Optics: From Micro-optics to Nanophotonics, Chapter 16: Digital Optics Application Pools", 60 pages, 2009, John Wiley & Sons, Ltd.

Levola, T., "Diffractive Optics for Virtual Reality Displays," Academic Dissertation, Joensuu 2005, University of Joensuu, Department of Physics, Vaisala Laboratory, 26 pages.

Kent Optronics, Liquid Crystal for Photonics, "Switchable Mirror/ Switchable Glass", retrieved from Internet Dec. 16, 2013, 1 page, http://www.kentoptronics.com/switchable.html.

Martinez, O.A. et al., "Thin Curved Eyepiece for See-Through Head Wearable Display", U.S. Appl. No. 14/537,780, filed Nov. 10, 2014, Whole Document.

Kent Optronics, Inc., Liquid Crystals for Photonics, "Liquid Crystal Switchable Mirror", 2 pages, http://www.kentoptronics.com, prior to Mar. 12, 2014.

Cakmakci, O. et al., "eyepiece for head wearable display using partial and total internal reflections", U.S. Appl. No. 14/139,277, filed Dec. 23, 2013, whole document.

Luttmann, A.M. et al., "Eyepiece With Switchable Reflector for Head Wearable Display", U.S. Appl. No. 14/209,995, filed Mar. 13, 2014, whole document.

PCT/US2014/067458, PCT International Search Report and Written Opinion, mailed Feb. 6, 2015 (12 pages).

Martinez, M. et al., "Segmented Diffractive Optical Elements for a Head Wearable Display", U.S. Appl. No. 13/930,845, filed Jun. 28, 2013, whole document.

PCT/US2014/067458, PCT International Preliminary Report on Patentability, mailed Jun. 30, 2016 (11 pages).

Surface S1

$$sag(x,y) = \frac{c(x^2+y^2)}{1+\sqrt{1-(1+k)c^2(x^2+y^2)}} + X2c*x^2 + X3c*x^3 + XY2*xy^2 + X4*x^4$$

C = 1/RDY    X2c: 4.84E-02
RDY = -32.24    X3c: -3.50E-03
K=0    XY2: 1.70E-03
    X4: 1.0560E-04

---

Surface S2

$$sag(x,y) = \frac{c(x^2+y^2)}{1+\sqrt{1-(1+k)c^2(x^2+y^2)}} + X2c*x^2 + X3c*x^3 + XY2*xy^2 + X4c$$
$$*x^4 + X2Y2*x^2y^2 + Y4*y^4 + X5*x^5 + X3Y2*x^3y^2 + XY4*xy^4 + Y6*y^6$$

C = 1/RDY    X2c: 3.7460E-03    X5: -2.4200E-08
RDY = -32.24    X3c: 4.4388E-05    X3Y2: 2.2270E-08
K=0    XY2: 1.2400E-04    XY4: -1.1780E-07
    X4: 2.3444E-06    Y6: 6.2040E-08
    X2Y2: 4.6420E-06
    Y4: -5.2800E-06

---

Surface S3

$$sag(x,y) = \frac{c(x^2+y^2)}{1+\sqrt{1-(1+k)c^2(x^2+y^2)}} + X2c*x^2 + X3c*x^3$$
$$+XY2c*x*y^2 + x4c*x^{\wedge}4$$

C = 1/RDY    X2c: +5-03
RDY = -25.24 mm    X3c: -3.52E-05
k=0    XY2c: -2.548E-05
    X4c: +1.42E-05

FIG. 5A

Surface S4

$$sag(x,y) = \frac{c(x^2 + y^2)}{1 + \sqrt{1 - (1+k)c^2(x^2 + y^2)}} + X2c * x^2 + X3c * x^3 + X4c * x^4$$

C = 1/RDY     X2c: -1.478E-03
RDY = -33.2     X3c: +1.09E-04
k=0     X4c: +4.506E-07

FIG. 5B

SEE-THROUGH EYEPIECE FOR HEAD WEARABLE DISPLAY

CROSS REFERENCE TO RELATED APPLICATION

The present patent application is a continuation of U.S. application Ser. No. 14/135,284 filed on Dec. 19, 2013, the contents of which are incorporated herein by reference.

TECHNICAL FIELD

This disclosure relates generally to the field of optics, and in particular but not exclusively, relates to eyepieces for head wearable displays.

BACKGROUND INFORMATION

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIGS. 5A & 5B are appendixes that provide sag equations describing surface curvatures of a demonstrative implementation of a see-through eyepiece, in accordance with an embodiment of the disclosure.

DETAILED DESCRIPTION

Embodiments of a system and apparatus for a see-through eyepiece of a head wearable display are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
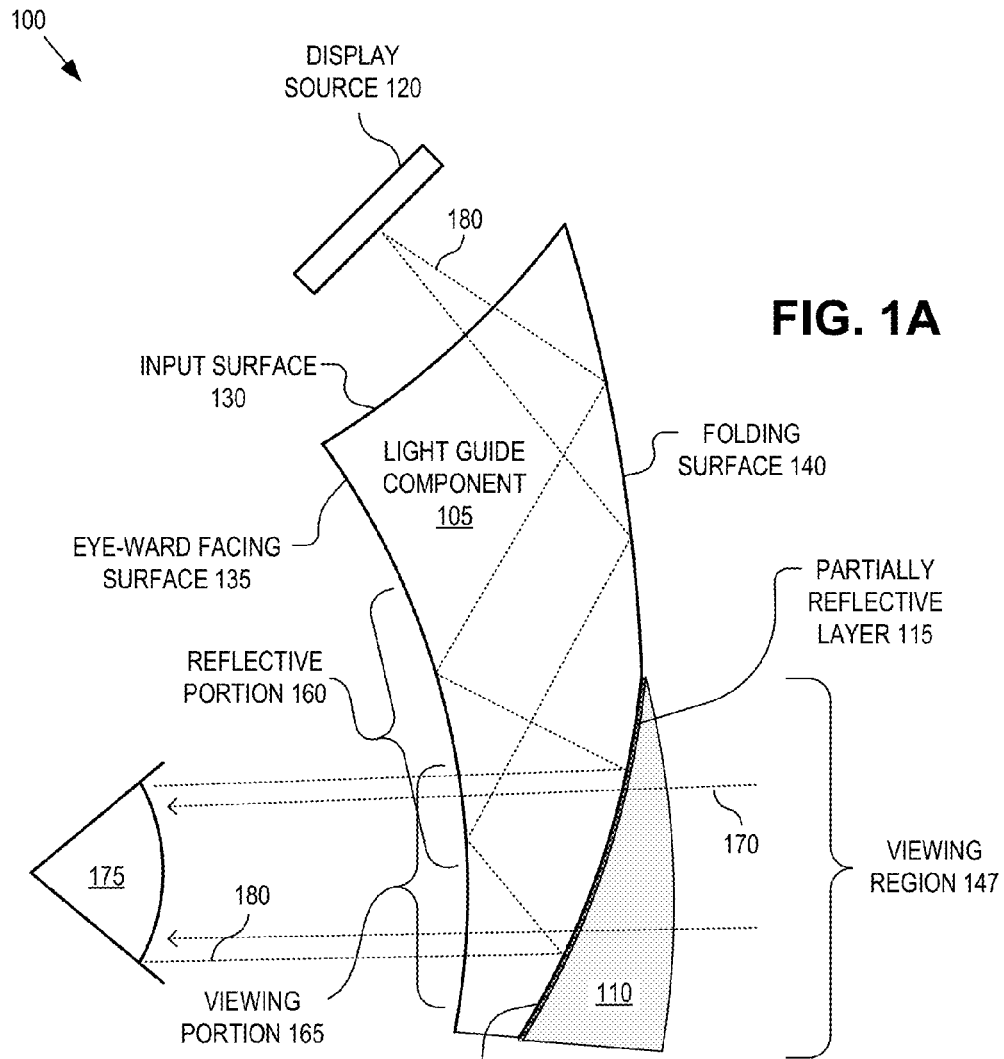
FIG. 1A is a plan view illustration of a see-through eyepiece for a head wearable display, in accordance with an embodiment of the disclosure.
Figure 1B:
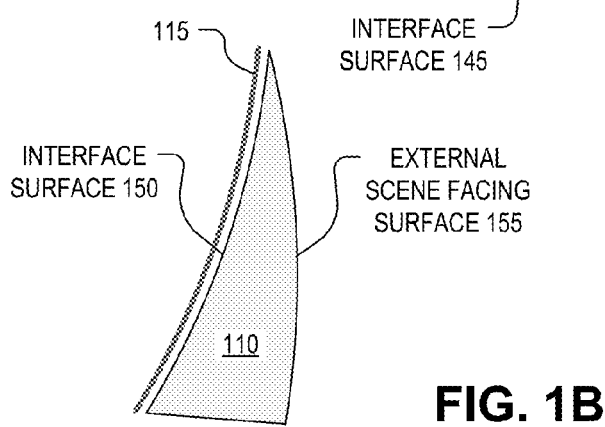
FIG. 1B illustrates a curved wedge portion of a see-through eyepiece for a head wearable display, in accordance with an embodiment of the disclosure.
Figure 2:
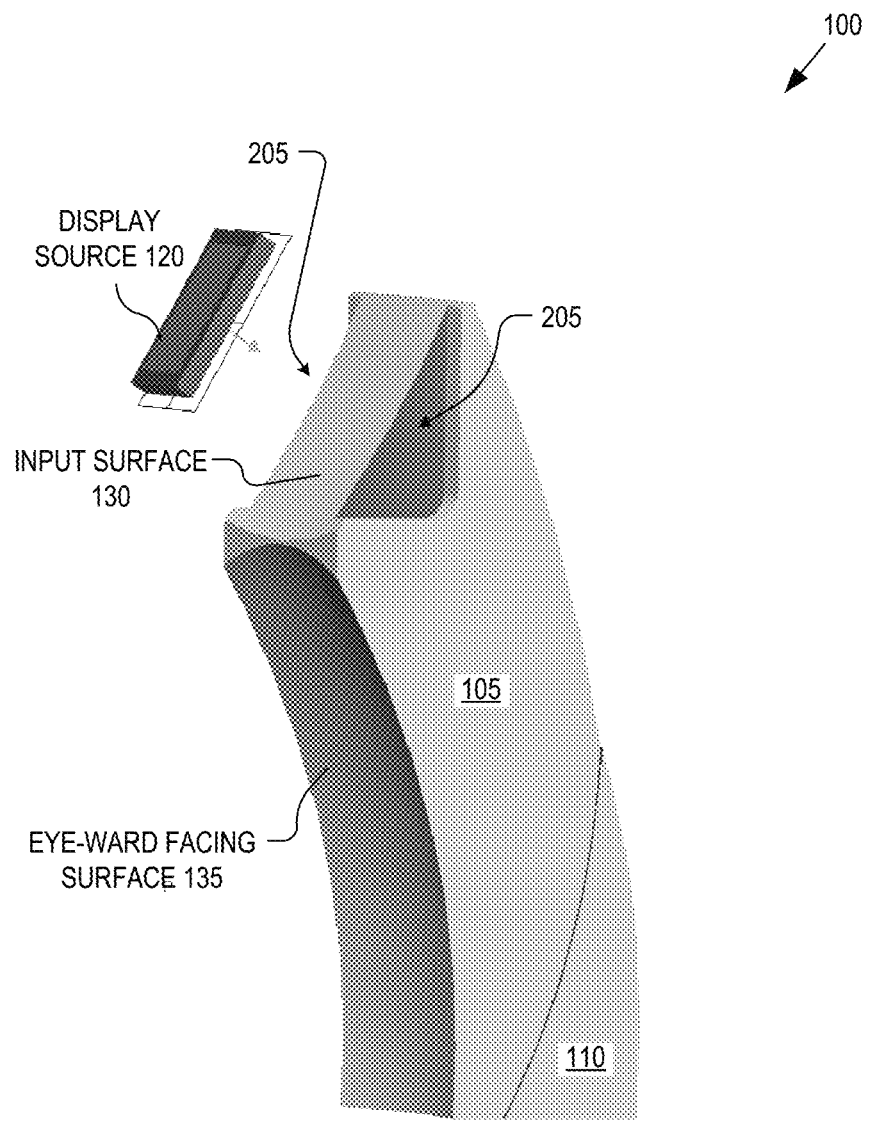
FIG. 2 is a perspective illustration of a see-through eyepiece for a head wearable display, in accordance with an embodiment of the disclosure.
Figure 3:
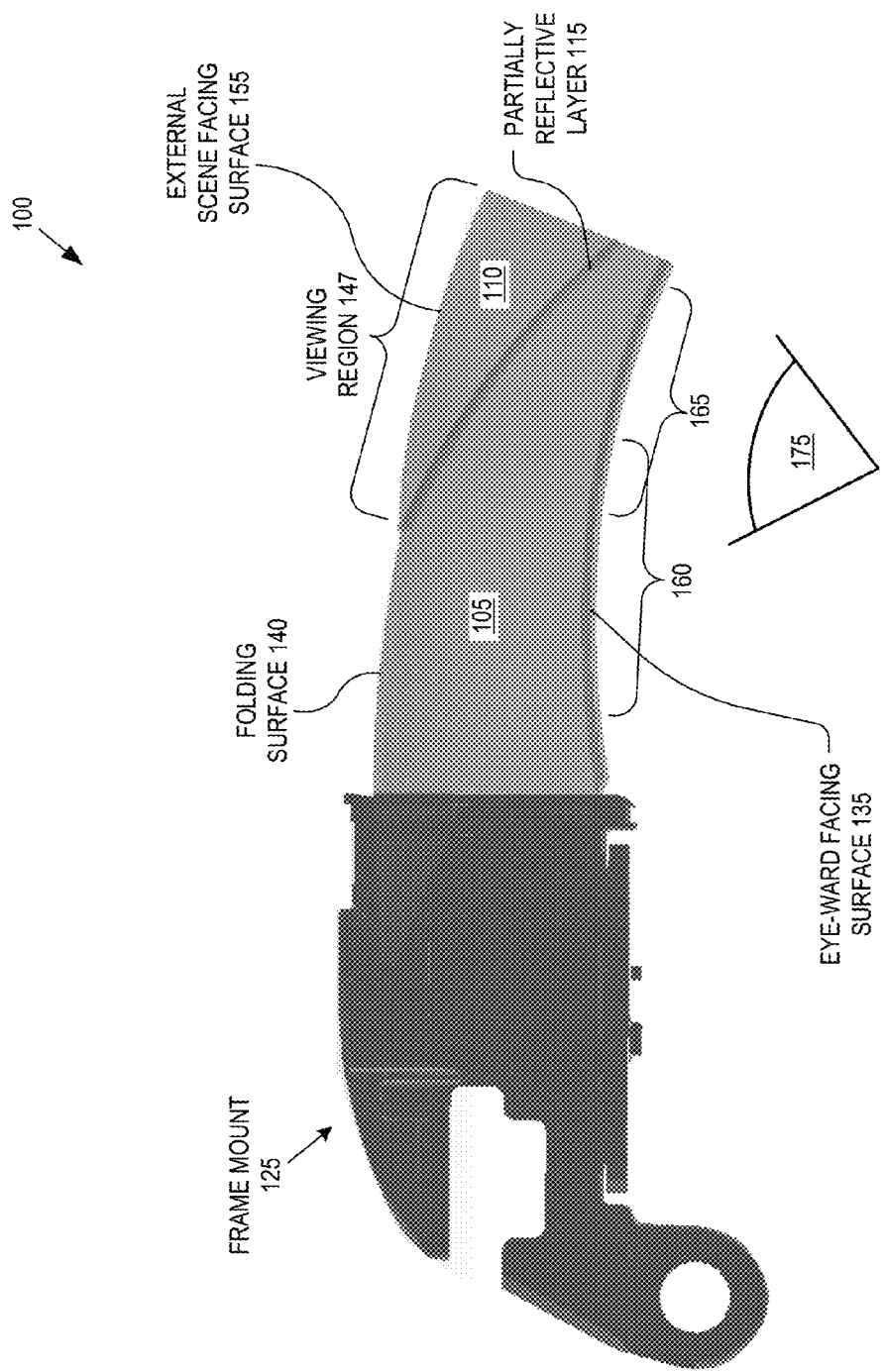
FIG. 3 is a plan view illustration of a see-through eyepiece including a frame mount, in accordance with an embodiment of the disclosure.

FIGS. 1A, 2, and 3 illustrates a see-through eyepiece 100 for use with a head wearable display, in accordance with an embodiment of the disclosure. FIG. 1A is a plan view of eyepiece 100, FIG. 2 is a perspective view of eyepiece 100, and FIG. 3 is another plan view including a frame mount. The illustrated embodiment of eyepiece 100 includes a light guide component 105, a see-through add-on component 110, a partially reflective layer 115, a display source 120, and a frame mount 125. FIG. 1B illustrates just the see-though add-on component 110 and partially reflective layer 115. The illustrated embodiment of light guide component 105 includes an input surface 130, an eye-ward facing surface 135, a folding surface 140, an interface surface 145, and a viewing region 147. The illustrated embodiment of add-on component 110 includes an interface surface 150 and an external scene facing surface 155. Eye-ward facing surface 135 includes a reflective portion 160 and a viewing portion 165. Viewing region 147 is a volumetric region of eyepiece 100 in front of eye 175, while viewing portion 165 is a portion of eye-ward facing surface 135 where display light 180 and external scene light 170 pass through to eye 175.

In one embodiment, light guide component 105 and add-on component 110 are fabricated as two independent pieces that are bonded together along interface surfaces 145 and 150 using a clear adhesive. Light guide component 105 and add-on component 110 may be fabricated of two different materials having the same index of refraction, or both of the same material. For example, light guide component 105 and add-on component 110 may be fabricated of optical grade plastic (e.g., Zeonex E-330-R), glass, or otherwise. In one embodiment, the components are injection molded to shape, processed to add various optical coatings/layers discussed below, and then bonded together along interface surfaces 145 and 150. In one embodiment, light guide component 105 and add-on component 110 are fabricated of a material having a higher index of refraction than air to induce total interface refraction ("TIR") at one or more surfaces within light guide component 105.

In the illustrated embodiment, partially reflective layer 115 is disposed between light guide component 105 and add-on component 110 along interface surfaces 145 and 150. Partially reflective layer 115 may be coated onto one or both interface surfaces 145 and 150 prior to bonding the two components together. Partially reflective layer 115 may be implemented as a convention beam splitter (e.g., non-polarized beam splitter film) or a polarized beam splitter ("PBS"). The splitting ratio may be selected according to design needs, but in one embodiment may be implemented as a 50/50 beam splitter. In embodiments where partially reflective layer 115 is implemented using a PBS, display source 120 would output polarized light with a polarization selected to substantially reflect off of partially reflective layer 115. A PBS design can serve to increase the efficiency of the optical system. For example, LCD or liquid crystal on silicon ("LCoS") are example display technologies that output polarized light. Of course, external polarizing films may be used in connection with other non-polarized display technologies. When operating with polarized light, it can be beneficial to use low stress materials to reduce the influence of birefringence on the optical design. Accordingly, in some embodiments, light guide component 105 may be fabricated of low stress plastics, glass, or other low stress optical grade materials.

Since beam splitter is only partially reflective and light guide component 105 and add-on component 110 are fabricated of optically transmissive materials (e.g., clear plastic), viewing region 147 permits at least a portion of external scene light 170 to pass through to eye 175. Eyepiece 100 operates as an optical combiner combining external scene light 170 with display light 180 emitted through viewing portion 165 along an eye-ward direction into eye 175. In this way, eyepiece 100 is capable of displaying an augmented reality to eye 175.

During operation, display source 120 emits display light 180 from a peripheral location offset from viewing region 147 into light guide component 105. Display source 120 may be implemented using a variety of different display technologies including a liquid crystal display ("LCD"), an organic light emitting diode ("OLED") display, or otherwise. Display light 180 may include computer generated images.

Display light 180 is incident into light guide component 105 through input surface 130. Input surface 130 is a curved surface with optical power. In one embodiment, input surface 130 operates to magnify display light 180 for a near-to-eye configuration. In one embodiment, input surface 130 includes curvature refinements to control optical distortion. Surface S1 in FIG. 5A presents a sag equation with coefficient values describing an example curvature for input surface 130, in one embodiment.

After display light 180 enters into light guide component 105 through input surface 130, it is incident upon folding surface 140, which is disposed adjacent to input surface 130. Folding surface 140 operates to reflect display light 140 towards reflective portion 160 of eye-ward facing surface 135. In one embodiment, both eye-ward facing surface 135 and folding surface 140 are clear surfaces that reflect display light 180 via TIR and careful design control over the incident angles of the light path followed by display light 140. By using TIR for the reflections off of folding surface 140 and eye-ward facing surface 135, eyepiece 100 achieves desirable industrial design characteristics, since eyepiece 100 will appear as a clear eyepiece to external observers. In another embodiment, folding surface 140 may be coated with a reflecting film to reflect display light 180 without need of TIR. Surface S2 in FIG. 5A presents a sag equation with coefficient values describing an example curvature for folding surface 140, in one embodiment.

After folding (e.g., reflecting) display light 140 at folding surface 140, display light 180 is directed towards reflective portion 160 of eye-ward facing surface 135. Eye-ward facing surface 135 is disposed opposite to folding surface 140 in an opposing configuration. As mentioned above, the display path angles are carefully controlled during design such that the incident angle of display light 180 on reflective portion 160 of eye-ward facing surface 135 results in a reflection due to TIR. Surface S3 in FIG. 5A presents a sag equation with coefficient values describing an example curvature for eye-ward facing surface 135, in one embodiment. Accordingly, in one embodiment, display light 180 undergoes just two reflections within light guide component 105 via TIR.

Reflective portion 160 redirects display light 180 to interface surface 145 in viewing region 147. Interface surface 145 is disposed opposite eye-ward facing surface 135 in an opposing configuration, but is adjacent to folding surface 140 though it has a different curvature than folding surface 140. Interface surface 145 is coated with partially reflective layer 115, which again reflects display light 180 to viewing portion 165 of eye-ward facing surface 135. Surface S4 in FIG. 5B presents a sag equation with coefficient values describing an example curvature for interface surface 145, in one embodiment.

Display light 180 incident upon viewing portion 165 of eye-ward facing surface 135 is incident at an angle that does not result in TIR. As such, display light 180 passes through eye-ward facing surface 135 in viewing portion 165 along an eye-ward direction. As is illustrated in FIG. 1A, reflective portion 160 and viewing portion 165 of eye-ward facing surface 135 may overlap each other. These portions of eye-ward facing surface 135 describe non-mutually exclusive portions of eye-ward facing surface 135 where display light 180 is either reflected or transmitted due to its incident angle and the properties of TIR.

The reflective lensing due to the combined reflections off of folding surface 140, eye-ward facing surface 135, and partially reflective layer 115 along with the refractive lensing from input surface 130 and eye-ward facing surface 135 at viewing portion 165 combine to magnify display light 180 for easy viewing in a near-to-eye configuration. This magnification operates to displace the virtual image further back from the eye (e.g., 10 m) to allow the eye to readily bring it into focus. In one embodiment, the lensing provided by input surface 130 further serves to reduce optical distortion while the lensing provided by folding surface 140, eye-ward facing surface 135, and partially reflective layer 115 further serves to reduce astigmatism. The lensing provided by these optical surfaces facilitates an image plane at display source 120 that is flatter than 0.1 diopters and the design supports a 20% modulation transfer function ("MTF") at 55 cycles/mm, after design tolerances, sufficient for high definition resolutions with a 9.5 um pitch display source.

In one embodiment, add-on component 110 is bonded onto light guide component 105 in viewing region 147. Interface surface 150 of add-on component 110 is designed with a curvature that smoothly mates to the curvature of interface surface 145 of light guide component 105. Furthermore, add-on component 110 is designed with a curved prism or curved wedge shape that forms a smooth, continuous outer surface that includes folding surface 140 and external scene facing surface 155. In one embodiment, the first, second, and third derivatives of the curvatures of both folding surface 140 and external scene facing surface 155 are controlled to achieve a smooth and continuous transition at the junction between folding surface 140 and external scene facing surface 155.

In one embodiment, add-on component 110 and light guide component 105 are fabricated of material(s) having the same or similar index of refraction. This serves to remove optical power at the junction between interface surfaces 145 and 150 for external scene light 170 that passes through viewing region 147 to eye 175. Additionally, the curvature of external scene facing surface 155 is complementary to eye-ward facing surface 135 to counter-act the refractive lensing of viewing portion 165 of eye-ward facing surface 135. In short, the input angle of external scene light 170 entering external scene facing surface 155 is substantially equivalent to the output angle of external scene light 170 exiting eye-ward facing surface 135. As such, eyepiece 100 passes at least a portion of external light 170 through viewing region 147 substantially without lensing, thereby permitting the user to have a substantially undistorted view of the ambient environment in front of eyepiece 100.

In one embodiment, the surfaces of eyepiece 100 at which the optical path of display light 180 is redirected via TIR are coated with anti-fingerprint coatings. For example, in one embodiment, both folding surface 140 and eye-ward facing surface 135 are coated with an anti-fingerprint coating to reduce the impact of fingerprint oils on total internal reflection at these surfaces. Anti-fingerprint coatings are known in the art.

FIG. 2 is a perspective view of a see-through eyepiece 100 illustrating how display source 120 may be mounted to input surface 130. In one embodiment, light guide component 105 may include recesses 205 to facilitate a clip on mount for attaching display source 120 to light guide component 105. As illustrated, in one embodiment, light guide component 105 and add-on component 110 have substantially rectangular cross-sectional shapes.

Eyepiece 100 is suitable for use as a compact eyepiece for a head wearable display. For example, eyepiece 100 may be suitably designed with an 18 mm eye relief, a 16 degree diagonal field of view, a 20 mm to 30 mm length for eye-ward facing surface 135, and an 8 mm to 11 mm circular diameter eyebox. Of course, other dimensions may be implemented.

Figure 4A:
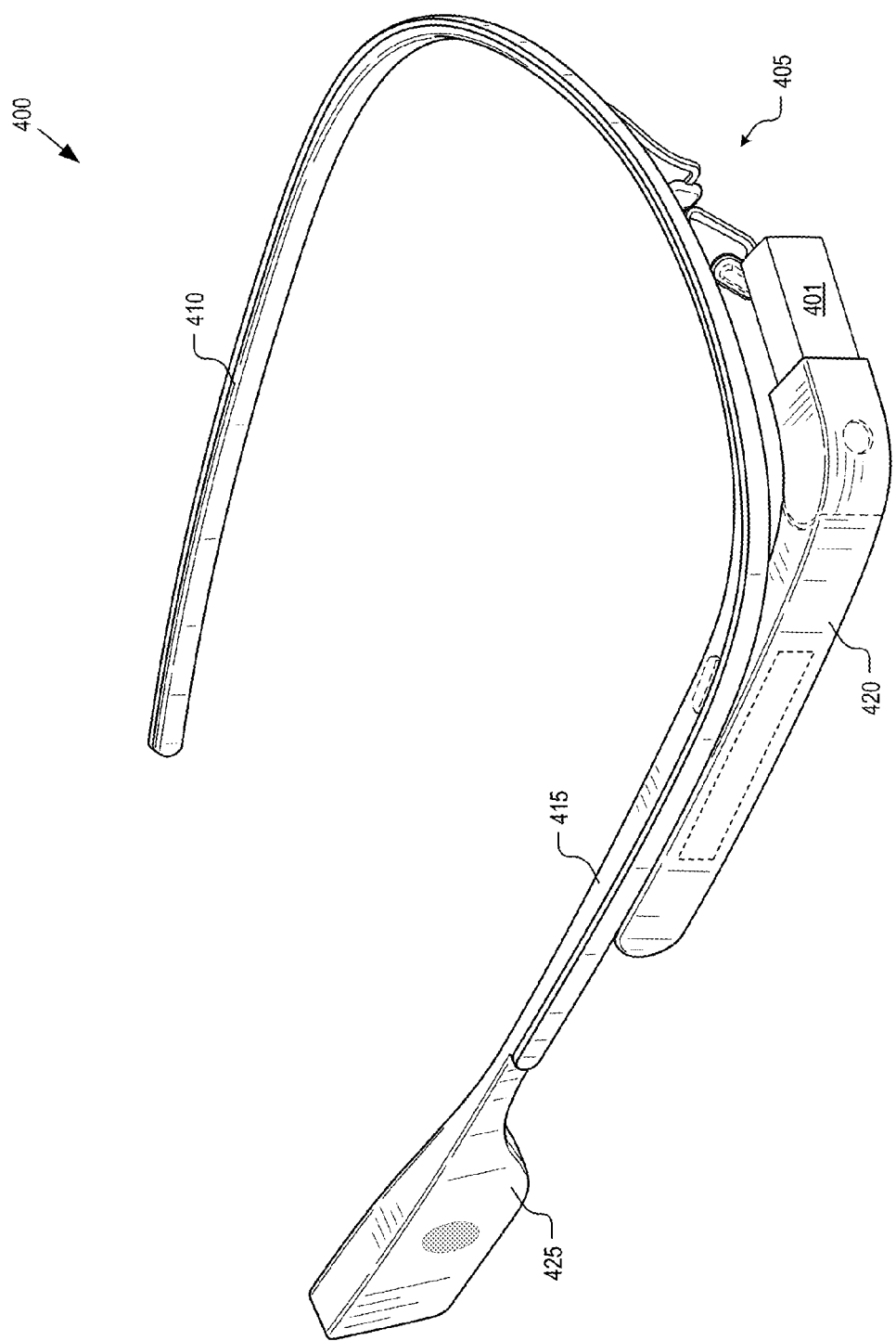
FIGS. 4A and 4B illustrate a demonstrative head wearable display including a see-through eyepiece, in accordance with an embodiment of the disclosure.
Figure 4B:
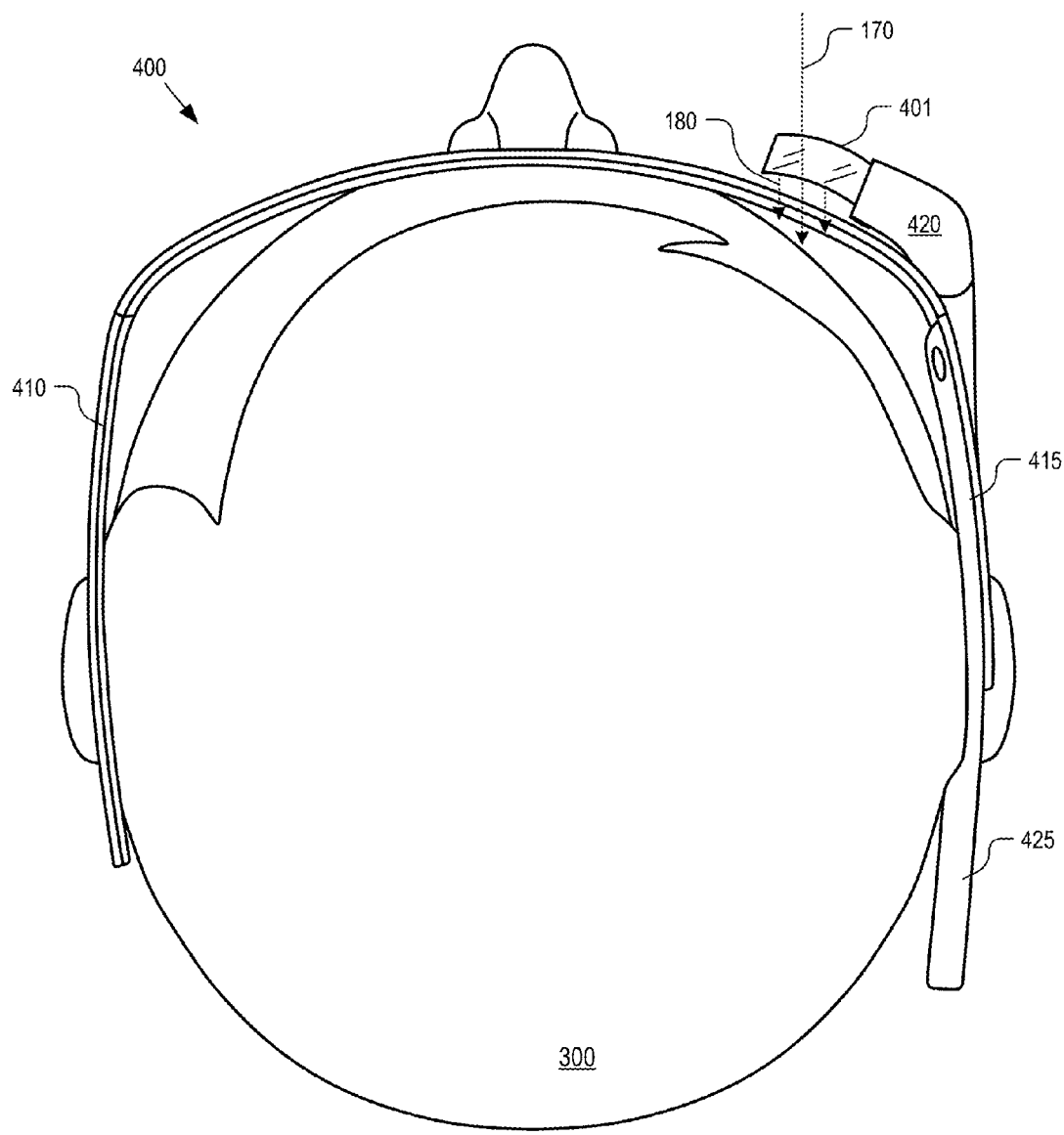

FIGS. 4A and 4B illustrate a monocular head wearable display 400 using a see-through eyepiece 401, in accordance with an embodiment of the disclosure. FIG. 4A is a perspective view of head wearable display 400, while FIG. 4B is a top view of the same. See-through eyepiece 401 may be implemented with embodiments of eyepiece 100 as discussed herein. The see-through eyepiece 401 is mounted to a frame assembly, which includes a nose bridge 405, left ear arm 410, and right ear arm 415. Housings 420 and 425 may contain various electronics including a microprocessor, interfaces, one or more wireless transceivers, a battery, a camera, a speaker, etc. Although FIGS. 4A and 4B illustrate a monocular embodiment, head wearable display 400 may also be implemented as a binocular display with two eyepieces 401 each aligned with a respective eye of the user when display 400 is worn.

The see-through piece 401 is secured into an eye glass arrangement or head wearable display that can be worn on the head of a user. The left and right ear arms 410 and 415 rest over the user's ears while nose bridge 405 rests over the user's nose. The frame assembly is shaped and sized to position viewing region 147 in front of an eye of the user. Other frame assemblies having other shapes may be used (e.g., traditional eyeglasses frame, a single contiguous headset member, a headband, goggles type eyewear, etc.).

The illustrated embodiment of head wearable display 400 is capable of displaying an augmented reality to the user. See-through eyepiece 401 permits the user to see a real world image via external scene light 170. Left and right (binocular embodiment) display light 180 may be generated by display sources 120 mounted in peripheral corners outside the user's central vision. Display light 180 is seen by the user as a virtual image superimposed over external scene light 170 as an augmented reality. In some embodiments, external scene light 170 may be fully, partially, or selectively blocked to provide sun shading characteristics and increase the contrast of image light 180 via tinting add-on component 110.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head wearable display, the eyepiece comprising:
    a light guide component for receiving display light at a peripheral location and emitting the display light at a viewing region, the light guide component including:
        an eye-ward facing surface having a reflection portion and a viewing portion;
        a folding surface opposing the eye-ward facing surface, the folding surface oriented to reflect the display light received into the light guide component to the reflection portion of the eye-ward facing surface; and
        an interface surface disposed opposing the eye-ward facing surface in the viewing region and oriented to receive the display light reflected from the reflection portion of the eye-ward facing surface, wherein the interface surface and the folding surface are discontinuous surfaces with different curvatures; and
    a partially reflective layer disposed on the first interface surface in the viewing region, the partially reflective layer to reflect the display light through the viewing portion of the eye-ward facing surface.

2. The eyepiece of claim 1, wherein the partially reflective layer comprises a beam splitter or polarizing beam splitter that partially reflects the display light.

3. The eyepiece of claim 1, further comprising:
    a see-through add-on component mounted to the light guide component along the interface surface in the viewing region,
    wherein the partially reflective layer is disposed in the viewing region at an interface between the interface surface of the light guide component and the see-through add-on component, wherein the see-through add-on component and the viewing region of the light guide component are at least partially transparent to external scene light.

4. The eyepiece of claim 3, wherein the see-through add-on component is formed of a material having an index of refraction substantially equivalent to that of the light guide component.

5. The eyepiece of claim 3, wherein the interface surface comprises a first interface surface, and wherein the see-through add-on component comprises:
   a second interface surface having a size and curvature that mates to the first interface surface of the light guide component; and
   an external scene facing surface having a first curvature that is complementary to a second curvature of the eye-ward facing surface in the viewing region to substantially offset optical power of the eye-ward facing surface in the viewing region.

6. The eyepiece of claim 5, wherein the first curvature of the external scene facing surface of the eye-through add-on component forms a continuous surface with the folding surface of the light guide component.

7. The eyepiece of claim 1, wherein the reflection portion of the eye-ward facing surface and the folding surface are clear surfaces that are oriented to reflect the display light via total internal reflection.

8. The eyepiece of claim 1, further comprising:
   an input surface oriented to receive the display light into the light guide component at the peripheral location, wherein the input surface is a distinct and separate surface from the eye-ward facing surface.

9. The eyepiece of claim 8, wherein the folding surface, the eye-ward facing surface, and the interface surface are all curved surfaces shaped to impart optical power in reflection on the display light and wherein the light guide component has a rectangular cross-sectional shape.

10. The eyepiece of claim 9, wherein the light guide component magnifies the display light emitted out the viewing region relative to the display light received at the peripheral location.

11. The eyepiece of claim 1, wherein the folding surface and at least the reflection portion of the eye-ward facing surface are coated with an anti-fingerprint coating.

12. The eyepiece of claim 1, wherein the light guide component displays an image plane that is flatter than 0.1 diopters.

13. A head wearable display for displaying an image, the head wearable display comprising:
   a display source to generate display light;
   a see-through eyepiece including:
      a light guide component for guiding the display light received at a peripheral location and emitting the display light at a viewing region, the light guide component including an eye-ward facing surface having a reflection portion and a viewing portion, a folding surface oriented to reflect the display light to the reflection portion of the eye-ward facing surface, and an interface surface disposed in the viewing region, wherein the interface surface and the folding surface are discontinuous surfaces with different curvatures;
      a see-through add-on component mounted to the light guide component along the interface surface in the viewing region; and
      a partially reflective layer disposed at the interface surface in the viewing region, the partially reflective layer to reflect the display light through the viewing portion of the eye-ward facing surface; and
   a frame assembly to support the see-through eyepiece and the display source for wearing on a head.

14. The head wearable display of claim 13, wherein the partially reflective layer comprises a beam splitter or polarizing beam splitter that partially reflects the display light.

15. The head wearable display of claim 13, wherein the see-through add-on component is formed of a material having an index of refraction substantially equivalent to that of the light guide component.

16. The head wearable display of claim 13, wherein the interface surface comprises a first interface surface, and wherein the see-through add-on component comprises:
   a second interface surface having a size and curvature that mates to the first interface surface of the light guide component; and
   an external scene facing surface having a first curvature that is complementary to a second curvature of the eye-ward facing surface in the viewing region to substantially offset optical power of the eye-ward facing surface in the viewing region.

17. The head wearable display of claim 13, wherein the reflection portion of the eye-ward facing surface and the folding surface are clear surfaces that are oriented to reflect the display light via total internal reflection.

18. The head wearable display of claim 13, wherein the folding surface, the eye-ward facing surface, and the interface surface are all curved surfaces shaped to impart optical power in reflection on the display light.

19. The head wearable display of claim 13, wherein the light guide component and the see-through add-on component both have a rectangular cross-sectional shape.

20. The head wearable display of claim 13, wherein the folding surface and at least the reflection portion of the eye-ward facing surface are coated with an anti-fingerprint coating.

* * * * *